No. 638,283. Patented Dec. 5, 1899.
J. RUSSELL.
PROCESS OF PRESERVING MILK AND CREAM.
(Application filed Mar. 23, 1896.)
(No Model.)
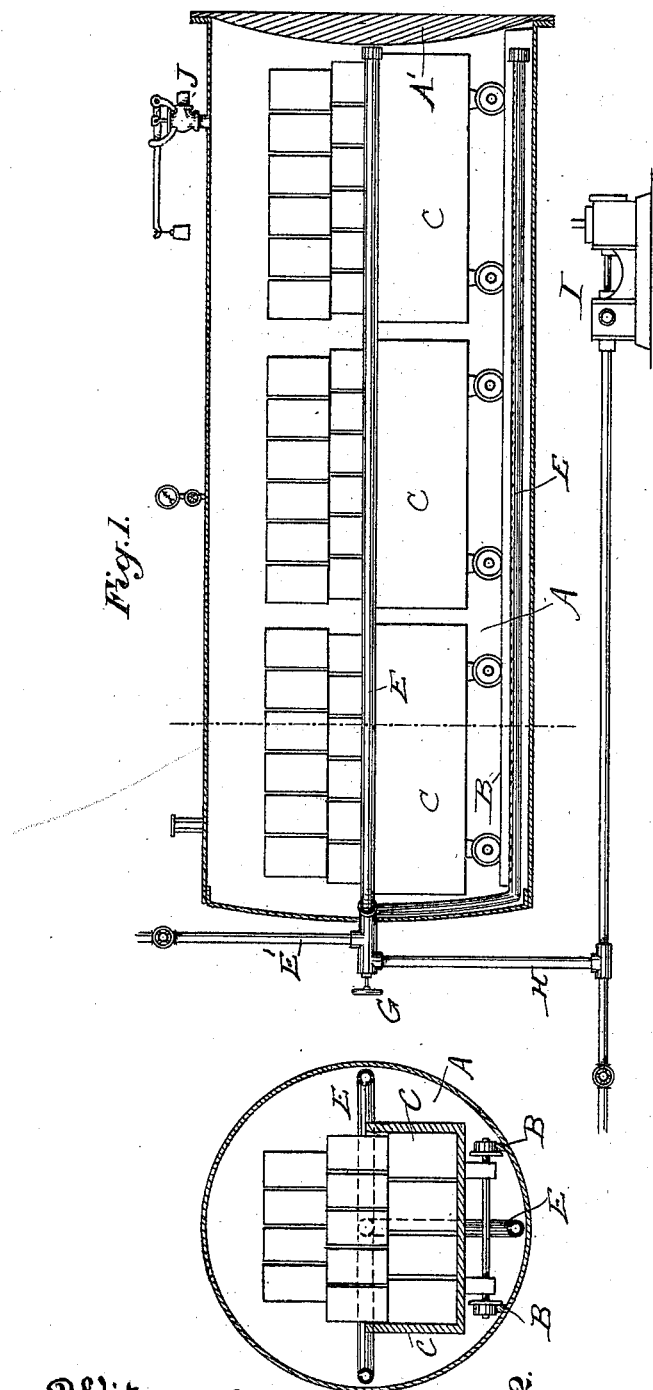
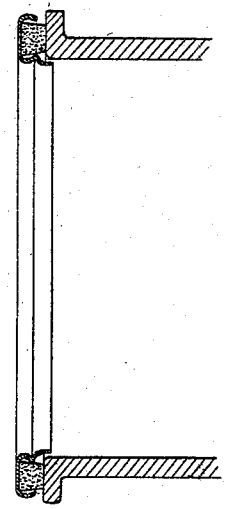
Witnesses,
Inventor,
John Russell

United States Patent Office.

JOHN RUSSELL, OF SAN FRANCISCO, CALIFORNIA, ASSIGNOR TO EDWIN NORTON, OF MAYWOOD, ILLINOIS.

PROCESS OF PRESERVING MILK AND CREAM.

SPECIFICATION forming part of Letters Patent No. 638,283, dated December 5, 1899.

Application filed March 23, 1896. Serial No. 584,538. (No specimens.)

*To all whom it may concern:*

Be it known that I, JOHN RUSSELL, a citizen of the United States, residing in the city and county of San Francisco, State of California, have invented an Improvement in Processes for Purifying and Preserving Milk and Cream in its Natural State; and I hereby declare the following to be a full, clear, and exact description of the same.

My invention relates to a novel process for purifying and preserving milk and cream and preventing deterioration or separation; and it consists, essentially, in passing it through operations which are hereinafter more fully described.

The following is a description of my newly-invented process for cleansing, purifying, and preserving milk and cream and preventing separation of the solids from the water in same.

The main object of this invention is to first cleanse the milk from all impurities and then to destroy germs of putresence or any element or property in milk or cream promoting or tending to fermentation, putrefaction, or decomposition.

My process consists in first purifying the milk and cream and separating them from foreign substances and also from each other and then subjecting the cream or the remixed milk and cream to heat under certain conditions within hermetical sealing jars or receptacles, whereby all germs that might injuriously affect the milk are destroyed and the milk or cream so treated will remain in a sweet and unchanged condition for an indefinite period.

In the accompanying drawings I have shown an apparatus which I have used for carrying out my process, in which—

Figure 1 is a longitudinal section of the heating-chamber, showing the cars and cans, the vacuum-pump, pipe connections, gages, and cocks. Fig. 2 is a transverse section showing the cars within the chamber. Fig. 3 illustrates a form of jar adapted for the operation.

A is a chamber made of any suitable length and diameter, having rails B, upon which a car or cars C are movable into and out of the chamber. These rails are in line with similar rails exterior to the chamber and upon which the cars are brought to and removed from the chamber. The chamber is made of sufficient strength to resist whatever interior or exterior pressure may be necessary during the process, and it has a removable head A', which is taken off to admit and remove the cars and is secured and hermetically sealed after a load has been introduced. The cars may be made of any suitable description, having wheels and a framework, upon which the cans are sufficiently supported, to be introduced into the chamber and removed therefrom. Perforated pipes E extend through the chamber, through which steam may be admitted, as previously described, through connection with the exterior pipes E', having suitable cocks for the admission of steam. After the steam has been sufficiently employed these cocks are closed and other cocks G are opened, which connect through pipes H with the vacuum-pump I, by which the steam or hot air may be extracted. Pipes J serve to admit cold air, and by the condensation thus effected the covers will be forced down by atmospheric pressure and the cans sealed.

In carrying out my process the milk is first placed in any well-known form of mechanical separator, and the cream and milk passing through it are separated from each other and from any dirt or foreign substances, the latter remaining in the machine.

If cream is to be prepared, it is placed in jars or receptacles for further treatment. If milk is to be preserved, the cream and milk are immediately remixed after leaving the separator and are placed in jars of a size and shape convenient for future sale and use.

My process may be completed either by first heating the contents of the jars to a certain temperature before sealing to drive out the air, then cooling and sealing the jars, and finally subjecting them to a temperature which will destroy all germs and again cooling them, or the jars may be first sealed and then subjected to the required germ-destroying temperature in a single operation and afterward cooled.

In the first method the jars are placed in a receptacle provided with thermometer and vacuum-gage. The receptacle is then hermetically closed. Steam of more than two atmospheres pressure is then admitted at the end of said receptacle until the temperatures of the source of the heat and of the milk and cream are uniform. As soon as a pressure of two atmospheres is reached the steam is cut off, so that the milk and cream are subjected to a steam-and-air bath of about 100° centigrade. The steam and hot air are then rapidly extracted from said receptacle and its contents by means of a vacuum-pump, which also removes the air from the milk. Cold air is then admitted, and by the condensation thus effected the covers, which up to this time rested lightly on the bottles, will be forced down by atmospheric pressure, and the bottles and cans are hermetically sealed. The door of the receptacle is now opened and the bottles and cans carefully examined and agitated, after which the bottles and cans are again placed in the receptacle and heated by steam under pressure to such a degree of temperature above 100° centigrade as will effectually destroy all germs of fermentation and also prevent separation. By this process the milk and cream are heated to a temperature of 235° Fahrenheit for twenty-five minutes, more or less, then rapidly cooled by admitting cold air into said receptacle until the bottles and cans are cool enough to admit of immersing in cold water.

The effect of the first heating is to drive the air out of the milk and cause it to escape through the openings beneath the loosely-placed covers, and to form enough vapor to produce a vacuum within the containing vessels, so that when cooled the covers will be forced down upon the jars and hermetically seal them by the well-known rubber gasket or similar device, and, if desired, a clamp may be added to retain the covers in place.

In the second method the jars are filled and the covers are applied and at once hermetically sealed, after which they are at once subjected to a heat which will sterilize and destroy the germs, the pressure generated within the jar being sufficient to prevent ebullition.

When the first method is employed, the first heating is not usually sufficient to destroy all germs with certainty, as it is not desired to boil the milk, which would give an undesirable flavor, but after the covers have been hermetically closed, as above described, the additional heat necessary to destroy the germs can be applied without ebullition, because the internal pressure of the generated vapor will be sufficient to prevent it, while allowing the necessary temperature to effect the destruction of the germs.

It will be understood that the process here described as applied to the milk in its ordinary condition—that is, with its cream forming a part of it—may also be applied to cream alone after it has been separated from the milk with the same result.

Milk and cream thus treated, being cleansed and purified and all germs of putresence or any element or property in milk promoting or tending to fermentation, putrefaction, or decomposition being effectually destroyed and separation of all solids from the water in same prevented by being heated under pressure and without exposure to the air, possesses other advantages than that of keeping sweet for months or years. It does not undergo those changes that occur when milk is boiled or sterilized in the ordinary way and is entirely free from the flavor of the same. It is as sweet and palatable as milk direct from the cow and will keep sweet for an indefinite period.

Having thus described my invention, what I claim as new, and desire to secure by Letters Patent, is—

1. A process for purifying and preserving milk and cream in its natural condition, consisting in separating the cream and milk from each other and from their contained impurities, then placing the remixed cream and milk in covered jars and placing said jars in a hermetically-closed vessel, then admitting steam to said vessel and until the temperatures of the source of heat and of the milk and cream are substantially uniform; then rapidly exhausting the steam and hot air from the vessel and simultaneously removing the air from the milk, and then admitting cold air to the vessel to cool the contents of the jars and by the condensation thus effected automatically and hermetically seal the covers of the jars by atmospheric pressure.

2. In a process for purifying and preserving milk and cream and in which the milk and cream are placed within jars having loosely-placed covers, the sealing of the jars consisting in placing the jars in a hermetically-closed vessel and raising the temperature of the vessel and the contents of the jar, to form sufficient vapor to produce a vacuum within the jars and then admitting cold air to the vessel and by the condensation thus effected automatically and hermetically seal the covers of the jars by atmospheric pressure.

3. A process for purifying and preserving milk and cream consisting in separating the cream and milk from each other and from the contained impurities, then placing the remixed cream and milk in jars and placing the latter in a hermetically-sealed vessel, then admitting steam to said vessel to drive the air out of the milk and to form enough vapor to produce a vacuum within the jars, then admitting cold air to the vessel to cool the contents of the jars and to automatically seal the covers of the jars by atmospheric pressure, then removing and agitating the jars and again placing them in said receptacle and finally reheating the jars and by the presence of the internal pressure of the generated vapor avoiding ebullition.

4. A process for purifying and preserving milk and cream consisting in sterilizing the milk and cream in jars having loosely-placed covers whereby the air driven from the milk, by the sterilizing process, is permitted to escape and a vacuum is formed within the jars, and then lowering the temperature of the vessel in which the jars are placed so that by the condensation thus effected and the vacuum in the jars the covers of the jars are hermetically sealed by atmospheric pressure.

5. The herein-described process of preserving food in vessels, consisting in placing the food in vessels provided with covers adapted to be sealed by atmospheric pressure, placing the vessels with their covers in place within a receiver, exhausting the air in the vessels, and sealing the covers on the vessels by the sudden admission of air to the receiver.

6. The herein-described process of preserving hermetically-sealed food, consisting in placing the food in vessels provided with covers adapted to be sealed by atmospheric pressure, placing the vessels with their covers in place within a receiver, exhausting the air in the vessels, sealing the covers on by the sudden admission of air to the receiver and finally heating the contents of the vessels to a temperature which will destroy all germs.

In witness whereof I have hereunto set my hand.

JOHN RUSSELL.

Witnesses:
   GEO. H. STRONG,
   S. H. NOURSE.